United States Patent

Katz

[11] Patent Number: 5,206,094
[45] Date of Patent: Apr. 27, 1993

[54] FUEL CELL EVAPORATIVE COOLER

[75] Inventor: Murray Katz, Newington, Conn.

[73] Assignee: The United States of America as represented by the Secretary of the Air Force, Washington, D.C.

[21] Appl. No.: 621,098

[22] Filed: Nov. 30, 1990

[51] Int. Cl.$^5$ .................. H01M 8/04; H01M 8/12
[52] U.S. Cl. ........................... 429/26; 429/20; 429/30; 429/38; 429/39
[58] Field of Search ............ 429/20, 26, 30, 38, 429/39

[56] References Cited

U.S. PATENT DOCUMENTS

| | | | |
|---|---|---|---|
| 3,761,316 | 9/1973 | Stedman | 136/86 R |
| 3,905,844 | 9/1975 | Shiraishi et al. | 148/177 |
| 3,905,884 | 9/1975 | Parenti, Jr. et al. | 204/129 |
| 4,098,959 | 7/1978 | Fanciullo | 429/25 |
| 4,574,112 | 3/1986 | Breault et al. | 429/26 |
| 4,582,765 | 4/1986 | Kothmann | 429/13 |
| 4,599,282 | 7/1986 | Hirota et al. | 429/26 |
| 4,623,596 | 11/1986 | Kamoshita | 429/26 |
| 4,664,986 | 5/1987 | Draper et al. | 429/26 |
| 4,678,723 | 7/1987 | Wertheim | 429/17 |
| 4,706,737 | 11/1987 | Taylor et al. | 165/47 |
| 4,994,331 | 2/1991 | Cohen | 429/17 |
| 5,041,344 | 8/1991 | Kamoshita et al. | 429/26 |

Primary Examiner—William R. Dixon, Jr.
Assistant Examiner—Alan Wright
Attorney, Agent, or Firm—Irwin P. Garfinkle; Donald J. Singer

[57] ABSTRACT

A fuel cell stack is cooled by evaporation of water into a carrier gas such as fuel or oxidant. The coolant and the carrier gas are separately supplied to the cooler, and this allows the fuel cell to operate at high pressure without raising cell temperature.

8 Claims, 1 Drawing Sheet

FUEL CELL EVAPORATIVE COOLER

STATEMENT OF GOVERNMENT INTEREST

The invention described herein may be manufactured and used by or for the Government for governmental purposes without the payment of any royalty thereon.

TECHNICAL FIELD

This invention relates to electrochemical cells such as fuel cells operable to generate significant amounts of electricity. More particularly, this invention relates to ceiling systems for fuel cell stacks, which cooling systems employ water as the coolant.

BACKGROUND OF THE INVENTION AND THE PRIOR ART

Fuel cells are arranged in stacks for the production of commercially significant amounts of electricity. The cells are formed from plate-like constituents which are stacked one atop the other and electrically connected in series so as to produce significant voltages. In fuel cells of the type which require cooling, there will be a plurality of cooling plates interspersed throughout the stack so that the operating temperature of the entire stack will remain in a predetermined range. The specific coolant used can be gaseous or liquid. The coolant system in a power plant using one or more fuel cell stacks is generally a closed system with the coolant being circulated through the stack or stacks in heat exchange relationship with the cells to pick up heat from the latter by boiling part of the coolant.

In U.S. Pat. No. 4,678,723 issued to Wertheim on Jul. 7, 1987, a stack of fuels cells is cooled by a coolant mixture of air and entrained water droplets comprising cathode exhaust and injected water fog. The problem with the Wertheim system is that the distribution of the water and air into the multi-cell stack is nearly impossible without separating the mixture. In accordance with my invention this problem is avoided by distributing the water and the air separately into each of the coolers and mixing the air and water within the cooler.

In the prior art Parenti, Jr. et al U.S. Pat. No. 3,905,884, an electrolysis cell system includes a compact electrolysis cell comprising gas diffusion electrodes on each side of an aqueous electrolyte retaining matrix. A portion of the hydrogen gas produced by the cell has water added thereto and is recirculated through a thermal exchange portion of the cell to remove waste heat from the cell and create a temperature gradient. The amount of water sprayed into the recirculating gas stream is controlled to maintain a predetermined temperature of the gas stream emerging from the thermal exchange portion of the cell. The problem with the Parenti et al system of water boiling is that cell pressure cannot be increased without raising cell temperature, and this limits the life of the various cell material.

In the Stedman U.S. Pat. No. 3,761,316 a fuel cell assembly utilizing the waste heat of a fuel cell to provide evaporative cooling of the cell is provided by a hydrophobic separator disposed in heat conducting relationship with the fuel cell. Water is fed under pressure to a cavity on one side of the separator, and as steam evolves from the coolant, it passes through the hydrophobic separator to ambient. The present invention is an improvement over Stedman in that a carrier gas is introduced to the cooler. This allows the designer to operate the fuel cell at high pressure without raising cell temperature which limits the life of the cell materials. For example, at a cell temperature limit of 300 degrees F, the reactant pressure is limited to 67 psia. With the carrier gas concept of this invention, it is possible to operate the cell at 300 degrees F. with much higher reactant pressures of as much as 200 psia, or even greater thus enhancing performance.

Fanciullo, U.S. Pat. No. 4,098,959, Kothman U.S. Pat. No. 4,582,765 and Kamoshita U.S. Pat. No. 4,623,596 disclose structure in the form of heat exchangers located in the region of the fuel cell to be cooled. Cooling is accomplished using the latent heat of vaporization to vaporize a liquid flowing through the heat exchange structure. Taylor U.S. Pat. No. 4,706,737 discloses an inlet manifold for delivery of water to act as a coolant medium for a fuel stack.

SUMMARY AND OBJECTS OF THE INVENTION

This invention relates to fuel cells and more particularly to a compact fuel cell system. Cooling a fuel cell stack by evaporation of water into a carrier gas such as fuel or oxidant has a major advantage over water boiling as taught by Parenti et al, Stedman and the known prior art. The carrier gas cooling mode allows the cell pressure and the coolant pressure to be equal and independent of temperature. Equal cell pressure and coolant pressure is necessary for structural reasons, and to maintain good electrical contact. In accordance with this invention cell pressure is independent of temperature and can be increased without raising cell temperature which usually limits the life of various cell materials.

A major design problem in the prior art is the formation and distribution of a water gas mixture or mists to the various coolers in the fuel cell stack with associated two-phase flow separation and flow stability difficulties. This invention is a modification of the prior art in that it teaches a manifolding system which avoids the two-phase distribution problem by providing positive control of the water and the carrier gas. In accordance with the disclosed embodiments of this invention, this is accomplished (1) by feeding water from a manifold to a spray bar at the inlet of each and every cooler in the stack; and (2) by introducing water and carrier gas on separate sides of a porous plate. The gas inlet manifold is otherwise conventional.

An object of the present invention is to provide a fuel cell system wherein the water coolant is sprayed into a carrier gas in each cooler in a stack of cells.

Another object of the present invention is to avoid the two phase flow distribution problems of the prior art by providing a spray or stream of water into each cooler separate from the flow of a carrier gas.

Still another object of this invention is to provide a fuel cell system wherein cooling water and a carrier gas are introduced on separate sides of a porous plate of the cooler.

BRIEF DESCRIPTION OF THE DRAWINGS

The foregoing and other objects, features and advantages of the present invention will become more apparent in the light of the following detailed description of preferred embodiments thereof as illustrated in the accompanying drawings, in which.

DESCRIPTION OF THE PREFERRED EMBODIMENTS

Figure 1:
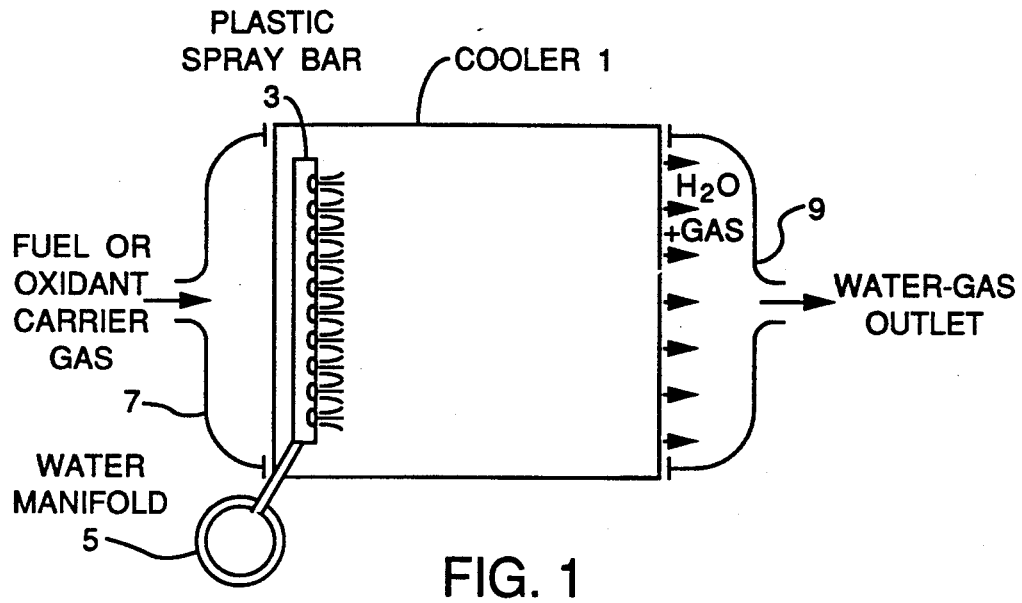
FIG. 1 is a schematic of a fuel cell cooler according to the present invention.

Referring to FIG. 1, a fuel cell system according to this invention comprises a cooler 1 for a fuel cell stack. Any number of cells may be combined to form a multi-cell stack which could be used in this system, and the coolers for the cells would be positioned in heat transfer relationship, as taught by the prior art patents. See Stedman U.S. Pat. No. 3,761,316, for example. As shown, a spray bar 3 is positioned at the inlet of each cooler. While only one such spray bar is shown, it will be understood, that one spray bar is used for each cooler in the cell stack. Each spray bar 3 is supplied with water from a manifold 5. Fuel or oxidant carrier gas to the cooler is supplied through a conventional manifold 7 which feeds the fuel cells adjacent to the cooler. Water and gas exit through a conventional outlet manifold 9.

In the operation of the system shown in FIG. 1, it will be noted that the water and carrier gas are not mixed until after being introduced into the cooler, and this has the effect of making the pressure independent of temperature, and hence increases the life of the various cell materials. This also avoids the problem of distributing a two-phase mixture into the coolers.

Figure 2:
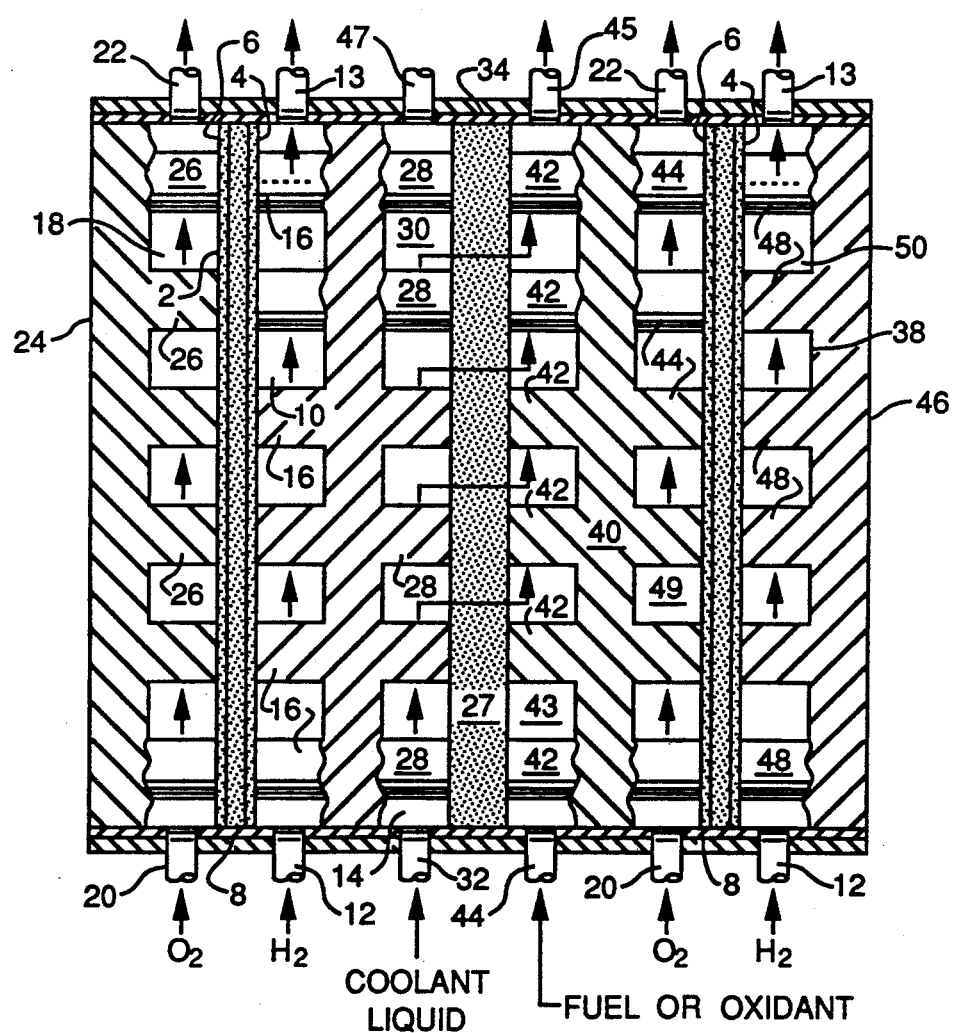
FIG. 2 is a schematic of another implementation of the invention in a fuel cell stack.

FIG. 2 shows a fuel cell stack having an evaporative cooling system in accordance with this invention. A first fuel cell 2 is shown having an anode 4, a cathode 6 and electrolyte between them which may be contained within an electrolyte matrix 8. The fuel cell is provided with a cavity 10 for a fuel gas which may be hydrogen having an inlet 12 and an outlet 13; the cavity is defined by the anode 4 and heat transfer means 14 having pins 16 thereon. Likewise, a cavity 18 for an oxidant gas, which may be oxygen, having an inlet 20 and an outlet 22 is defined by the cathode 6 and an end plate 24 having pins 26 thereon.

A porous separator 27, typically made of porous nickel or carbon, is disposed adjacent the heat transfer means 14 which has pins 28 thereon to define, with the porous separator 27, a cavity 30 having an inlet 32 for cooling liquid and a second inlet 44 for the carrier gas, which may be either hydrogen or oxygen. A plate 40 having pins 42 thereon is disposed adjacent the porous separator 27 and defines therewith a cavity having an inlet 44 and an outlet 45. An outlet 47 for the water cavity is shown for purging any gases that may become trapped. This outlet is optional. With this arrangement, the cell is cooled by means of water in a carrier gas, the water and gas being unmixed until introduced into the cooler.

Because it is desirable to use the waste heat of adjacent fuel cells to boil coolant liquid an adjacent cell 38, which is identical to the fuel cell 2, is spaced from the plate 40 by pins 48, thereby defining a cavity 49 for a reactant gas which may be oxygen. The cavity 49 has an oxygen inlet 20 and an outlet 22. End plate 46, which has pins 48 is disposed adjacent the second fuel cell 38 with which it defines a cavity 50. The cavity 50 has an inlet 12 and an outlet 13 for a reactant gas, which may be hydrogen.

With the second fuel cell 38, additional waste heat is transferred to the coolant liquid and the carrier gas via plate 40 and pins 44 and 42 and the porous separator 27.

While preferred embodiments of this invention have been described, it will be understood that the invention is subject to various modifications and adaptations. It is intended, therefore, that his invention be limited only by the appended claims as interpreted in the light of the prior art.

What is claimed is:

1. In a system for cooling a fuel cell stack, each fuel cell including an anode, a cathode spaced from said anode, and an electrolyte between said cathode and anode, a cooler for said fuel cell, said cooler being in heat transfer relationship with said fuel cell, said cooler having a coolant inlet and a carrier gas inlet, coolant being supplied to said cooler through said coolant inlet, and a carrier gas being separately supplied to said cooler through said carrier gas inlet, and wherein said coolant and carrier gas are mixed within said cooler.

2. The invention as defined in claim 1 wherein said coolant is sprayed into said coolant inlet.

3. The invention as defined in claim 2 wherein said coolant is water.

4. The invention as defined in claim 3 wherein said carrier gas is oxidant or fuel for said cell.

5. The invention as defined in claim 1 wherein said cooler comprises a cavity divided by a porous separator, said coolant being supplied to said cavity though said coolant inlet on one side of said separator, said carrier gas being supplied to said cavity through said carrier gas inlet on the other side of said separator, and wherein said coolant and carrier gas are mixed as said coolant and carrier gas pass though said porous separator.

6. The invention as defined in claim 5 wherein said coolant is water.

7. The invention as defined in claim 6, wherein said carrier gas is oxidant or fuel for said cell.

8. A fuel cell assembly comprising:

a fuel cell, including an anode, a cathode, electrolyte therebetween, a fuel gas cavity having in inlet and an outlet, and an oxidant gas cavity having an inlet and an outlet;

a hydrophobic separator disposed adjacent said fuel cell and spaced therefrom by heat transfer means which are contiguous with said fuel cell and with one side of said hydrophobic separator, said heat transfer means defining, with said fuel cell, one of said cavities, and said heat transfer means defining, with said hydrophobic separator, a first coolant cavity having an inlet;

means for supplying a coolant liquid to said first coolant cavity;

plate means disposed adjacent the other side of said hydrophobic separator and defining, with said hydrophobic separator, a second coolant cavity having an outlet, and means for supplying a carrier gas to said second cavity, whereby said coolant and carrier gas are mixed within said first and second cavities as said coolant and said carrier gas pass through said porous hydrophobic separator.

* * * * *